Patented Mar. 9, 1926.

1,576,072

UNITED STATES PATENT OFFICE.

NORMAN A. SHEPARD AND STANLEY KRALL, OF AKRON, OHIO, ASSIGNORS TO THE FIRESTONE TIRE AND RUBBER COMPANY, OF AKRON, OHIO, A CORPORATION OF OHIO.

PROCESS OF VULCANIZING RUBBER AND COMPOUND RESULTING THEREFROM.

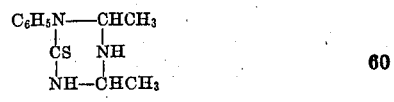

No Drawing. Application filed June 20, 1923, Serial No. 646,702. Renewed August 4, 1925.

*To all whom it may concern:*

Be it known that we, NORMAN A. SHEPARD and STANLEY KRALL, citizens of the United States, and residents of Akron, county of Summit, State of Ohio, have invented certain new and useful Improvements in Processes of Vulcanizing Rubber and Compounds Resulting Therefrom, of which the following is a specification.

This invention relates to the process of vulcanizing rubber and particulary to a new and improved method of combining rubber with vulcanizing agents to produce improved results in operation.

It relates specifically to a new and useful method of accelerating the vulcanization of rubber by the addition of certain organic substances as "accelerators" which are intended to quicken the process of vulcanization and to improve the qualities of the cured or vulcanized rubber.

Rubber accelerators, so called, have been known and studied for many years, but all of said substances are not suitable for use in obtaining stocks possessing certain characteristics and others, while possessing marked accelerating properties, have had a limited commercial application owing to difficulties attendant upon their use. Certain of said accelerators are too volatile and loss occurs in the milling and calendering. The fumes given off are objectionable and sometimes toxic so as to be dangerous to use and requiring special ventilating equipment. Other disadvantages are present in certain known accelerators which render them unsuitable for various reasons.

It is the purpose of the present invention to make use of certain substances which have heretofore been unused in the vulcanization of rubber, which substances do not have any of the disadvantages which have been described, are easy and cheap to manufacture, can be worked into rubber compounds without disagreeable results and which will mix well in the compounds without loss due to the excessive volatility.

The substances which have been developed by us are formed by the condensation of aldehyde-ammonias with mustard oils or thiourea, which are then incorporated in the rubber mix in the usual manner.

The reaction product of acetaldehyde-ammonia with phenyl mustard oil has been ascribed the following formula by Dixon (Journal Chem. Soc. (London) 53, 412 (1888)):

$$\begin{array}{c} C_6H_5N\!\!-\!\!CHCH_3 \\ | \quad\quad | \\ CS \quad NH \\ | \quad\quad | \\ NH\!\!-\!\!CHCH_3 \end{array}$$

This compound is 1-phenyl-2-thiocarbonyl-4, 6-dimethyl-hexahydro-1, 3, 5-triazine. It is non-volatile, well crystallized and is free from objectionable odor, and is well suited for use as an accelerator of vulcanization of rubber.

Similar products may be obtained by the reaction of other mustard oils (isothiocyanates) upon other aldehyde-ammonias. Thus from allyl mustard oil and acetaldehyde-ammonia is obtained 1-allyl-2-thiocarbonyl-4, 6-dimethyl-hexahydro-1, 3, 5-triazine; while from phenyl mustard oil and butyraldehyde is obtained 1-phenyl-2-thiocarbonyl-4, 6-di-butyl-hexahydro-1, 3, 5-triazine; and all of these reaction products are within the broad scope of the present invention, being rapid, easily handled and superior accelerators.

An example of the activity of these accelerators of vulcanization is as follows:

1.—93.5 parts of smoked sheet are mixed with 2 parts of sulphur, 2.5 parts of zinc oxide and 1 part of 1-phenyl-2-thiocarbonyl-4, 6-dimethyl-hexahydro-1, 3, 5-triazine and heated in a vulcanizer for forty-five minutes at 290° F. The product is well cured and vulcanization has taken place in one-fifth of the time of heating required to produce similar physical properties without the addition of the accelerator.

It will be appreciated that the formulæ given above are not restrictive of the invention and that as far as known to us we are the first to make use of the reaction products of aldehyde ammonias with mustard oils or thiourea for acceleration of rubber vulcanization.

What we claim is:

1. The process of vulcanizing rubber which comprises incorporating with rubber a small amount of a reaction product of an aldehyde-ammonia with a mustard oil, and heating the resultant product with a vulcanizing agent.

2. The process of producing vulcanized rubber which comprises incorporating with the rubber a small amount of a homologue or derivative of 2-thiocarbonyl-4, 6-dimethyl-hexahydro-1, 3, 5-triazine, and heating the resulting product with a vulcanizing agent.

3. The process of producing vulcanized rubber which comprises incorporating with the rubber a small amount of 1-phenyl-2-thiocarbonyl-4, 6-dimethyl-hexahydro-1, 3, 5-triazine, and heating the resulting product with a vulcanizing agent.

4. A vulcanized rubber having incorporated therein a small amount of the reaction product of an aldehyde-ammonia with a mustard oil.

5. A vulcanized rubber having incorporated therein a small amount of a homologue or derivative of 2-thiocarbonyl-4, 6-dimethyl-hexahydro-1, 3, 5-triazine.

6. A vulcanized rubber having incorporated therein a small amount of 1-phenyl-2-thiocarbonyl-4, 6-dimethyl-hexahydro-1, 3, 5-triazine.

NORMAN A. SHEPARD.
STANLEY KRALL.